United States Patent [19]

Oster

[11] E Re. 31,016

[45] Reissued Aug. 24, 1982

[54] ANTI-FRICTION SUCKER ROD GUIDE ASSEMBLY

[75] Inventor: Clarence Oster, Pecos, Tex.

[73] Assignee: Conoco Inc., Ponca City, Okla.

[21] Appl. No.: 218,599

[22] Filed: Dec. 22, 1980

Related U.S. Patent Documents

Reissue of:

[64] Patent No.: 4,182,537
Issued: Jan. 8, 1980
Appl. No.: 912,605
Filed: Jun. 5, 1978

U.S. Applications:

[63] Continuation-in-part of Ser. No. 784,098, Apr. 4, 1977, abandoned.

[51] Int. Cl.[3] ..... F16C 29/00

[52] U.S. Cl. ..... 308/4 A; 166/176; 166/241; 308/DIG. 8

[58] Field of Search ..... 308/4 A, 238, DIG. 8; 166/175, 176, 241; 175/325; 403/109, 223, 225, 227; 285/27

[56] References Cited

U.S. PATENT DOCUMENTS

| | | | |
|---|---|---|---|
| 1,985,229 | 12/1934 | Allen | 308/4 A |
| 2,153,787 | 4/1939 | Anderson | 308/4 A |
| 2,200,758 | 5/1940 | Thaheld | 308/4 A |
| 2,572,307 | 10/1951 | Brown et al. | 308/4 A |
| 3,103,391 | 9/1963 | Leathers | 308/4 A |
| 3,197,262 | 7/1965 | Fairchild | 308/4 A |
| 3,528,499 | 9/1970 | Collett | 308/4 A |
| 4,015,949 | 4/1977 | Baker et al. | 308/DIG. 8 |

*Primary Examiner*—Richard R. Stearns
*Attorney, Agent, or Firm*—Robert B. Coleman, Jr.

[57] ABSTRACT

An anti-friction sucker rod coupling and guide apparatus comprises:

(a) a rod member having an anti-friction surface along its cylindrical length;

(b) fasteners affixed at each end of the rod member for attaching the rod member within a sucker rod string;

(c) a rod guide having an inner anti-friction surface contacting the anti-friction surface of the rod member and slideably positioned about the rod member, the rod guide having an outer diameter sufficient to functionally contact the inner diameter of a tubing string in which the sucker rod string is positioned, the rod guide further including passageway sufficient to permit passage of produced fluid the fasteners adapted to maintain the rod guide on the rod member within deformation.

8 Claims, 2 Drawing Figures

ANTI-FRICTION SUCKER ROD GUIDE ASSEMBLY

Matter enclosed in heavy brackets [ ] appears in the original patent but forms no part of this reissue specification; matter printed in italics indicates the additions made by reissue.

RELATED APPLICATION

This application is a continuation-in-part of application Ser. No. 784,098, filed Apr. 4, 1977, and abandoned upon filing of this application.

BACKGROUND OF THE INVENTION

1. Field of the Invention

The invention relates to an improved anti-friction sucker rod coupling and guide.

2. Brief Description of the Prior Art

A method widely used for producing oil from subterranean formations is the reciprocation of a bottom hole pump by a long string of sucker rods actuated in a production tubing. A pumping unit powered by a prime mover such as an electric motor or a gas engine is positioned at the surface of the well and transmits reciprocal motion through the sucker rods to the pump. The total length of the sucker rods commonly varies from a few hundred feet to more than 15,000 feet.

Because of intentional deviation from vertical in drilling, or for a variety of unintentional causes, many oil wells have crooked holes so that on the up and down strokes of the sucker rod, the sucker rod, and particularly the sucker rod couplings are caused to rub against the well tubing. Even in wells which are straight, a pumping rate sometimes is used such that on the down stroke a portion of the sucker rods are forced under compression causing them to buckle slightly and causing rubbing against the side of the tubing which in turn results in expensive wear to the well tubing and/or the sucker rod string and consequent down time required to replace sucker rod worn by such rubbing.

Perhaps of even greater importance in these times of rapidly rising energy costs and scarcity of fuel is the increased amount of energy required to overcome the frictional loss caused by such rubbing.

For these reasons, particularly in order to conserve energy and reduce costs, it is highly desirable to provide a coupling which will have a reduced friction drag against the tubing, which will not wear holes in the tubing, and which will not wear away the coupling itself.

Attempts have been made to provide sucker rod couplings having improved resistance to wear. One method of attempting to counteract the wear of the coupling includes case hardening the coupling itself to provide an exterior surface of extremely hard steel calculated to resist wear. This is a satisfactory procedure to lessen wear on the coupling itself, but does not assist at all in eliminating the wearing away of the tubing in which the sucker rods operate nor in reducing the overall frictional loss of energy required for pumping.

Various other attempts have been made to overcome the problems heretofore mentioned with varying amounts of success. The closest approach to my invention appears to be exemplified by U.S. Pat. No. 3,528,499 wherein a plastic-fluted rod guide is fastened about a sucker rod, the rod guide being adopted to slide on the sucker rod rather than on the tubing string. However, the sucker rod is not polished nor does it have an anti-friction surface, and the sucker rod has tapered ends which would tend to deform the rod guide. It lacks the energy conserving anti-friction relationship between the anti-friction rod member surface and the mated rod guide anti-friction surface which is an important aspect of my invention.

U.S. Pat. Nos. 2,200,758 and 2,001,270 represent another approach to the problem and disclose rod guides which frictionally engage the tubing by means of spring members and the like and which are adapted to slideably fit about sucker rod joints. Again, the anti-friction relationship improvement of my invention is not suggested.

U.S. Pat. Nos. 3,049,382, 3,490,526, and 3,414,337 are exemplary of another approach which is in commercial use. According to this approach the rod guide moves with the sucker rod string and slides within the tubing. Again, my invention constitutes an improvement and demonstrates substantial energy savings over this type of system.

In a related art, U.S. Pat. Nos. 2,072,320, 2,572,307, and 3,894,780 disclose drilling string guides wherein a drilling string having rotary motion is centralized.

My invention constitutes a substantial advance in the art, as exemplified above, by providing for a very substantial reduction in the energy required to pump oil wherein a sucker rod string is employed, particularly from crooked bore holes.

OBJECTS OF THE INVENTION

An object of the invention is to provide an anti-friction sucker rod coupling and guide which reduces energy requirements for production of oil. Another object is to provide a process for reducing friction and energy used in producing hydrocarbons when employing a sucker rod string.

SUMMARY OF THE INVENTION

An apparatus and process for reducing friction and energy loss in pumping hydrocarbons wherein a sucker rod string is employed involves use of an anti-friction sucker rod coupling and guide comprising in combination:

(a) a rod member having an anti-friction surface along its cylindrical length;

(b) attachment means affixed at each end of the rod member for attaching the rod member within a sucker rod string;

(c) a rod guide slideably positioned about the rod member, the rod guide having an outer diameter sufficient to functionally contact the inner diameter of a tubing string in which the sucker rod string is positioned, the rod guide further including passageway sufficient to permit passage of produced fluid therethrough;

the attachment means adapted to maintain the rod guide on the rod member without deformation.

DESCRIPTION OF THE DRAWINGS

Figure 1:
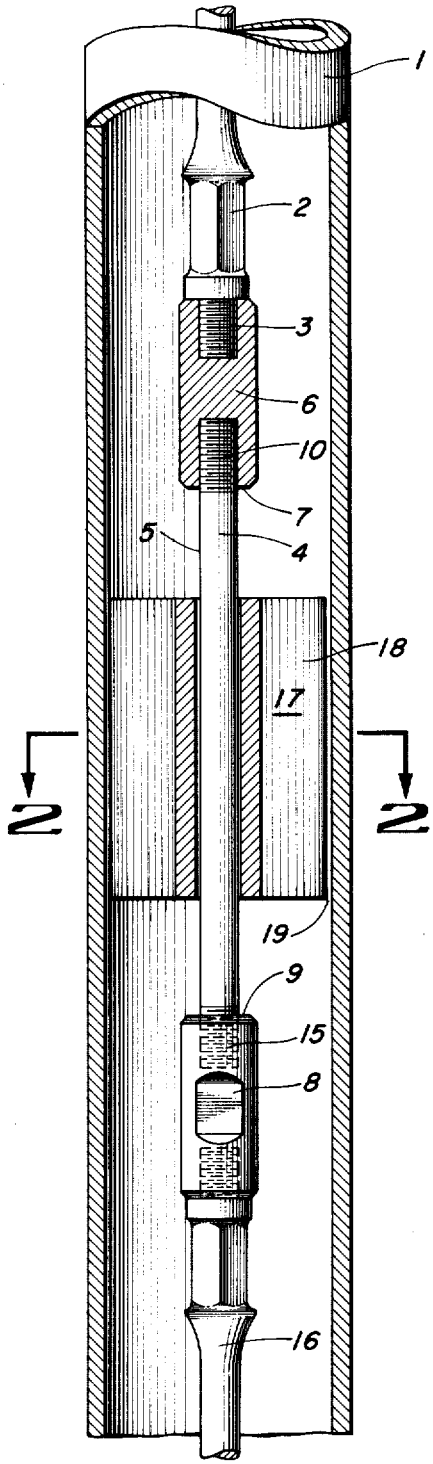
FIG. 1 has a longitudinal section through a well tubing having the anti-friction sucker rod coupling and guide apparatus implaced in the sucker rod string.

[FIG. 1 shows tubing string 1 having a cutaway section showing in cross section the anti-friction sucker rod coupling and guide apparatus of the invention implaced in a sucker rod string. Upper sucker rod 2 has a female coupling 3 with threads adapted for fit with a male sucker rod coupling. Rod member 4 having a polished anti-friction surface 5 along its cylindrical length has an upper shoulder 6 having an abutment surface 7 which is substantially perpendicular to the cylindrical length of the rod member and a lower shoulder 8 having an abutment surface 9 which is also substantially perpendicular to the cylindrical length. The rod member has an upper attachment means 10 which comprises a threaded male sucker rod member 11 adapted to fit into female sucker rod member 3. The rod member also has a lower attachment means 12 comprising a threaded female sucker rod member 13 adapted to fit threaded male sucker rod member 15 which serves to attach the apparatus within the sucker rod string to the lower sucker rod 16. Slideably positioned rod guide 17 has flutes 18 which contact tubing string 1 at one or more sites but have sufficient clearance 19 for insertion of the apparatus into the tubing string.]

*FIG. 1 shows tubing string 1 having a cutaway section showing in cross section the anti-friction sucker rod coupling and guide apparatus of the invention emplaced in a sucker rod string. Upper sucker rod 2 is fitted to a rod box 6 via threads 3. Rod member 4 having a polished anti-friction surface 5 along its cylindrical length is fitted to box 6 via male threads 10. Box 6 has an abutment surface 7 which is substantially perpendicular to the cylindrical length of the rod member when attached. Slideably positioned rod guide 17 has flutes 18 which contact tubing string 1 at one or more sites but have sufficient clearance 19 for insertion of the apparatus into the tubing string.*

*Rod member 4 is attached to lower sucker rod 16 via rod box 8 by means of threads 15. Box 8 has an abutment surface 9 which is substantially perpendicular to the cylindrical length of the rod member when attached.*

The vertical distance between abutting surface 7 and abutting surface 9 is sufficient that a reciprocating stroke of the pump can be made with anti-friction cylindrical surface 5 moving within the rod guide without the rod guide being moved vertically in relation to the tubing string 1.

Figure 2:
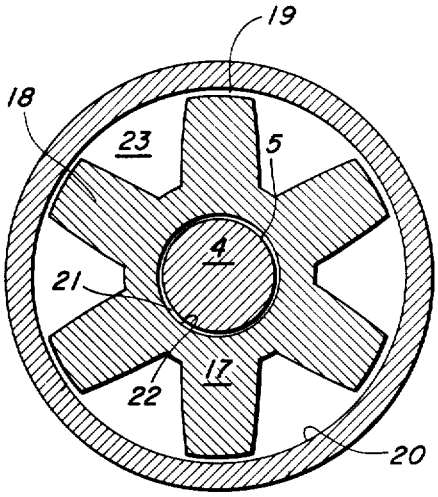
FIG. 2 is a cross sectional view taken along the line 2—2 of FIG. 1 showing the cross sectional configuration of the rod guide slideably positioned about the rod member.

FIG. 2 shows a top cross sectional view across line 2—2 shown in both FIGS. 1 and 2.

Rod guide 17 has flutes 18 in proximity to the inner surface 20 of tubing string 1. Rod member 4 having anti-friction surface 5 is sized in relationship to opening 21 in the rod guide having anti-friction surface 22 to allow for anti-friction reciprocating motion of the rod member 4. Openings 23 between the flutes 18 are sufficient to allow full production of fluids lifted by each pump stroke.

PREFERRED EMBODIMENTS OF THE INVENTION

According to a preferred mode, one or more of the anti-friction sucker rod coupling and guide assemblies of the invention are implaced in a sucker rod string in an oil well employing a sucker rod to pump fluids by reciprocating motion.

Eighty percent of artificial lift wells in the U.S. use conventional rod pumping systems. Use of such systems is well known to those skilled in the art. Pages 8, 9, 10, 16, 17, and 18 of a home study course issued by the Petroleum Extension Service of the University of Texas at Austin, Texas, in cooperation with the American Association of Oil Well Drilling Contractors, Dallas, Texas, entitled, "Introduction to Oil Well Service and Workover" (1971) are herewith incorporated by reference for the purpose of concise disclosure of conventional knowledge in the art of rod pumping. Basically the sucker rod string reciprocates up and down as energy is provided from a prime mover through a counterweight apparatus, a Pittman crank, a walking beam, a horsehead, a wireline hanger, and a polished rod. The lower end of the sucker rod string reciprocates a rod pump at its lower end pumping fluids up through the tubing string.

The assemblies are advantageously placed at points of deviation in the well bore where frictional losses and wear would otherwise occur. The assemblies can be assembled in the sucker rod string as if they were another length of sucker rod by screwing the threaded connections together.

The most advantageous points to implace the assemblies can readily be determined by directional surveys taken on the bore hole, by previous wear points noted from pumping experience, and the like. According to one embodiment, the assemblies of the invention are implaced in the more critically deviating areas. The assemblies of this invention can be used in combination with prior art rod guides in many situations.

The rod member can be fabricated of conventional structural materials such as steel and the like.

The anti-friction surface along the cylindrical length of the rod member can be any of a number of surfaces. For example, the surface can be polished steel, brass, and the like. It can have a lubricant such as molybdenum disulfide, graphite, or the like impregnated therein. It can also comprise a sleeve comprising an anti-friction material such as TEFLON halocarbon polymer, polyphenylene sulfide, polypropylene, high density polyethylene, nylon, and the like. Selection of a suitable anti-friction surface for the particular well environment taking into account temperature, corrosion effects, and the like is well within the skill of petroleum engineers and others skilled in the art.

A polished brass rod surface is one presently preferred embodiment.

The attachment means affixed at each end of the rod member can be any attachment means suitable for affixing the assembly in a sucker rod string.

According to one presently preferred embodiment, a female sucker rod coupling is affixed to one end of the rod member and a male sucker rod coupling is affixed to the other end of the rod member such that the assembly can simply be assembled in a sucker rod string as if it were another sucker rod.

The rod guide can be fabricated of any of a number of suitable materials. For example, it can be fabricated of a metal such as steel or brass and have an anti-friction insert which slides against the anti-friction surface of the rod member. According to a presently preferred mode, it is fabricated of an anti-friction organic polymer such as polyphenylene sulfide, high density polyethylene, polypropylene, a halocarbon polymer such as TEFLON polymer, nylon, and the like. It may also be fabricated of natural materials such as oak and other long wearing woods. The anti-friction surface can have materials such as molybdenum disulfide, graphite, and the like impregnated therein to provide lubricating properties.

According to a presently preferred mode, the rod guide is molded from a thermoplastic such as TEFLON polymer, nylon, high density polyethylene, polypropylene, polyphenylene sulfide, and the like.

The rod guide is slideably positioned about the rod member and has an outer diameter sufficient to functionally contact the inner diameter of the tubing string in which the sucker rod string is positioned. The outer diameter of the flutes on the rod guide is normally only slightly smaller than the internal diameter of the tubing string. The opening through which the anti-friction surface of the rod member reciprocates is preferably only slightly greater in diameter than the diameter of the anti-friction cylindrical surface of the rod member so as to provide a good anti-friction bearing surface.

The cylindrical length of the rod member between the abutting surfaces is preferably long enough so that the reciprocating stroke of the tubing string does not impart movement to the rod guide once implaced in the tubing string. Of course, the length can be longer than this. The critical feature is that the anti-friction surface of the rod member reciprocates along the anti-friction surface of the rod guide.

According to a presently preferred mode, the rod member is a conventional off-the-shelf polished rod of suitable length having a standard male threaded fitting on each end. The rod guide is slipped on the rod member and conventional rod boxes are screwed on each end to form a very practical embodiment of the combination. The rod box on each end serves to maintain the rod guide on the rod member without deformation. A male threaded fitting of a sucker rod is screwed into each open female fitting of each rod box on the assembly to implace the anti-friction sucker rod coupling and guide in the sucker rod string at an appropriate location.

Use of the anti-friction sucker rod coupling and guide of the invention results in a considerable and surprising decrease in the energy requirements needed to lift fluids such as oil. Other advantages are reduced pumping unit beam loads and rod loads resulting in reduced maintenance and the like, reduced horsepower requirements in the prime mover, preduced rod wear, reduced gear box torque and wear, elimination of tubing wear, and the like.

By way of exemplification, a dynamometer survey is conducted on a deviated well having 68 rod guides of the prior art type. The sucker rod string is then pulled and 8 one inch by 11 inch polished rod anti-friction sucker rod coupling and guide assemblies are implaced in the turn area (the kick-off) and the other 60 prior art rod guides are reimplaced as before. A dynamometer survey of the sucker rod string having the assemblies implaced indicates a reduction of load of 25%.

By way of further exemplification the sucker rod string with the 68 rod guides of the prior art type is found to last only three days before couplings are worn through with failure of the string. After implacement of the anti-friction sucker rod coupling and guide assemblies at the 8 locations in the turn area, the string operates satisfactory for over a year without failure.

This exemplification is provided in order to more fully explain the invention and provide information to those skilled in the art on how to carry it out. However, it is to be understood that the exemplification is not intended to function as limitation on the invention as described and claimed herein.

I claim:

1. An anti-friction sucker rod coupling and guide apparatus comprising in combination:

(a) an elongated polished rod member having a long axis, a standard male fitting on each end, and a polished [brass] *metal* anti-friction surface along its cylindrical length;

(b) a rod box having a shoulder perpendicular to the long axis of the rod member affixed at each end of the rod member for attaching the rod member within a sucker rod string such that the shoulders of the rod boxes form abutments encircling the rod member at each end;

(c) an elongated rod guide, fabricated of an anti-friction organic polymer having an inner bore along its long axis having a smooth surface contacting the polished [brass] *metal* anti-friction surface of the rod member, which is slideably positioned about the rod member, the rod guide having an outer diameter sufficient to functionally contact the inner diameter of a tubing string in which the rod guide is positioned, the rod guide including passageways sufficient to permit passage of produced fluid therethrough, the rod guide having a shoulder perpendicular to the long axis of its inner bore at each of its ends adapted for abutment against the shoulders of the rod boxes affixed at each end of the rod member; the rod boxes adapted to maintain the rod guide on the rod member without deformation.

2. The apparatus of claim 1 wherein the organic polymer is a halocarbon polymer, an olefin polymer, a polyphenylene sulfide polymer, or a polyamide polymer.

3. The apparatus of claim 2 wherein the outer diameter of the rod guide is defined by aligned longitudinal flutes extending the length thereof, each of the flutes intersecting a plane of the cylindrical axis of the rod at an angle thereto, and wherein the organic polymer is a halocarbon polymer.

4. In a process for pumping hydrocarbons with a sucker rod string; the improvement comprising placing in the string an apparatus comprising:

(a) an elongated polished rod member having a long axis, a polished [brass] *metal* anti-friction surface along its cylindrical length, a standard male fitting on each end;

(b) a rod box having a shoulder perpendicular to the long axis of the rod member affixed at each end of the rod member for attaching the rod member within the sucker rod string such that the shoulders of the rod boxes form abutments encircling the rod member at each end;

(c) an elongated rod guide, fabricated of an anti-friction organic polymer having an inner bore along its long axis having a smooth surface contacting the polished [brass] *metal* anti-friction surface of the rod member, which is slideably positioned about the rod member, the rod guide having an outer diameter sufficient to functionally contact the inner diameter of a tubing string in which the rod guide is positioned, the rod guide including passageways sufficient to permit passage of produced fluid therethrough, the rod guide having a shoulder perpendicular to the long axis of its inner bore at each of its ends adapted for abutment against the shoulders of the rod boxes affixed at each end of the rod member; the rod boxes adapted to maintain the rod guide on the rod member without deformation.

5. The improvement of claim 4 wherein the organic polymer is a halocarbon polymer, an olefin polymer, a polyphenylene sulfide polymer, or a polyamide polymer.

6. The improvement of claim 5 wherein the outer diameter of the rod guide is defined by aligned longitudinal flutes extending the length thereof, each of the flutes intersecting a plane of the cylindrical axis of the rod guide at an angle thereto; wherein the rod guide is fabricated of a halocarbon polymer.

*7. The apparatus of claim 3 wherein the polished metal anti-friction surface is polished brass.*

*8. The improvement of claim 6 wherein the polished metal anti-friction surface is polished brass.*

* * * * *